Sept. 26, 1944.    H. M. ELSEY    2,359,097
MOLDED ARTICLE
Filed July 17, 1941    2 Sheets-Sheet 1

WITNESSES:

INVENTOR
Howard M. Elsey.
BY
Ezra W. Savage
ATTORNEY

Sept. 26, 1944.      H. M. ELSEY      2,359,097
MOLDED ARTICLE
Filed July 17, 1941      2 Sheets-Sheet 2
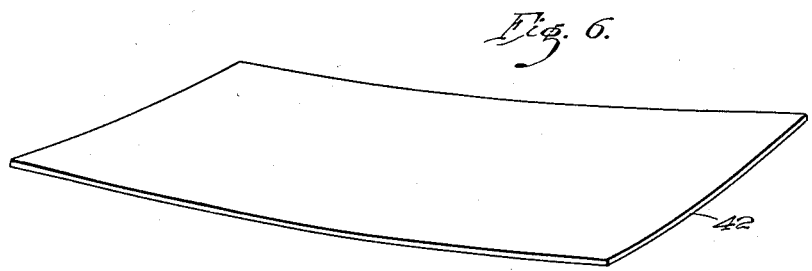
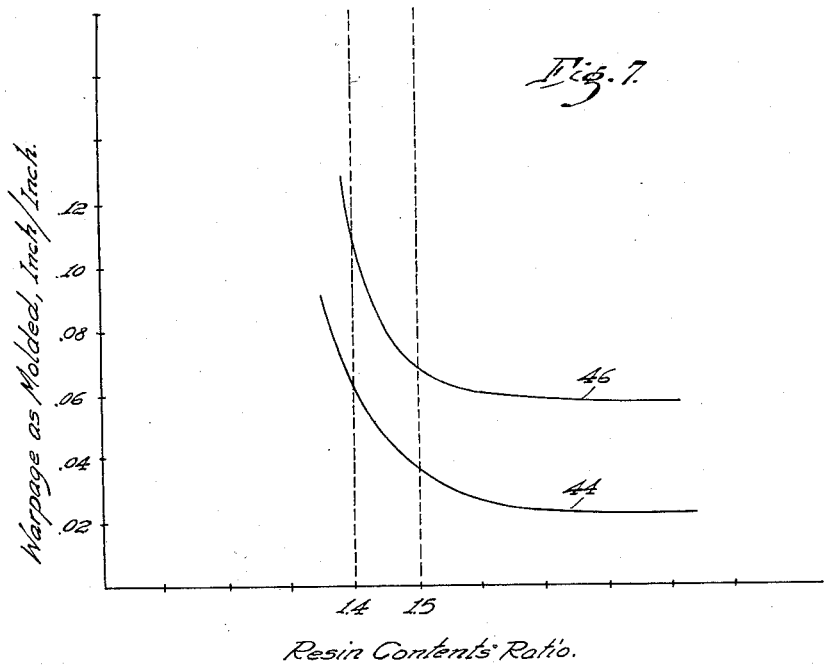
WITNESSES:      INVENTOR
                Howard M. Elsey.
                BY
                ATTORNEY Patented Sept. 26, 1944

2,359,097

UNITED STATES PATENT OFFICE 2,359,097

MOLDED ARTICLE

Howard M. Elsey, Oakmont, Pa., assignor to Westinghouse Electric & Manufacturing Company, East Pittsburgh, Pa., a corporation of Pennsylvania Application July 17, 1941, Serial No. 402,884

4 Claims. (Cl. 154—45.9)

This invention relates to molded articles, and more particularly laminated material carrying an organic finish upon one surface. In addition to meeting the requirements of good adhesion, the organic finish has a negligible odor level.

In the molding of laminated articles from synthetic resins, it has been found desirable to incorporate a decorative surface finish upon at least one of the faces of the molded article. When subjected to varying conditions of temperature, humidity and mechanical treatment, surface finishes of this type may delaminate, check and even change color unless prepared in a predetermined manner.

Specifically, the preparation of panels for use in refrigerators, for example as inside door panels, which are exposed to a wide range of temperatures and high humidity, the organic finish is subjected to severe conditions. The bond between the organic finish and the remainder of the laminated panel is determinative of the life and appearance of the panel. Furthermore, the organic finish must be such that the odor produced therefrom must be of an extremely low order to prevent complaints by the user. The odors evolved from certain organic finishes are absorbed by the food products within the refrigerator, such as butter, and is detrimental to the food being stored.

The object of this invention is to provide a substantially odorless surface coating for laminated panels.

A further object of this invention is to provide an organic finish coating for laminated articles, the coating having good bond strength and durability when in service.

Other objects of the invention will become apparent from the following description when taken in conjunction with the accompanying drawings, in which:

Fig. 6 is a view in perspective of the molded article of this invention; and

Fig. 7 is a graph, the curves of which illustrate the warpage as molded for different resin contents of the base material of the article shown in Fig. 6.

In producing molded articles characterized by a tenacious adherence of an organic finish on one surface, it is desirable to employ as a base portion a fibrous material impregnated with a phenolic resin binder. Such base portions are inexpensive and are characterized by high strength and chemical inertness to moisture and heat.

Upon the fibrous base portion impregnated with phenolic resin, it has been discovered that applying a surface sheet capable of bonding to the base portion carrying the organic finish, having surface characteristics of color, gloss and hardness, produces the most desirable results. Such a surface sheet, when consolidated under heat and pressure with the base portion, will result in a substantially unitary article with the surface coating upon one face thereof. When produced in the manner herein specified, the surface coating will adhere tenaciously to the surface sheet and to the base portion. The surface sheet and coating will resist delamination under the most adverse conditions encountered in service, particularly in conjunction with refrigerators. In describing the invention reference will be made extensively to the application of the invention to refrigerators, however, the invention may be applied to all kinds of other uses.

Figure 1:
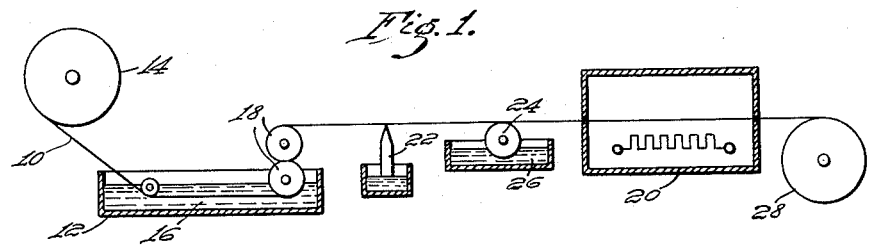
Figure 1 is a schematic view of apparatus employed in this invention for impregnating fibrous material in a predetermined manner.

Referring to Figure 1 of the drawings, there is illustrated an apparatus suitable for producing a surface sheet for the molded article of this invention. A continuous strip 10 of fibrous material, such, for example, as paper, prepared from alpha pulp which, for reasons to be hereinafter detailed, is preferred for certain uses, is delivered from a roll 14 to an impregnating tank 12. The strip of paper 10 is immersed below the surface of the phenolic resin solution 16 incorporating suitable fast-drying solvents. This particular phenolic condensation resin is an odorless fast-setting resin. Several of the known phenolic condensation resins prepared under various conditions of temperature and pressure with suitable catalysts have been found to produce a satisfactory article. It is desirable in some cases to employ the phenolic resin produced by the process disclosed and claimed in the copending application of W. C. Weltman, Serial No. 347,112, filed July 24, 1940, assigned to the same assignee as this invention.

After traversing the phenolic resin solution 16, the strip of alpha pulp paper 10 is suitably squeezed between rolls 18 to remove excess phenolic resin. It has been found that for the best adhesion of the decorative surface organic finish to be applied hereinafter to the strip of paper, one surface of the strip 10 should be substantially free from phenolic resin. Accordingly, the underside of the strip 10, as shown in Fig. 1, is passed over a scraper 22 which removes most of the phenolic resin present on the surface of the strip of paper. In addition the scraped surface is subjected to a wiping action by a roll 24 carrying a solvent for the phenolic resin. The roll dips into the phenolic solvent 26 and conveys a small quantity to the underside of the strip 10. In its travel roll 24 wipes the underside of the strip clean of the phenolic resin dissolved by the solvent. Suitable solvents for this purpose are alcohol, toluene and the like. The strip 10 is then conveyed through a heating oven 20 to cause partial polymerization of the resin distributed in the strip to the B stage, after which it is rolled into a roll 28.

The term "resin ratio" as used in the specification and claims is the ratio of the weight of paper and phenolic resin to the weight of the dry paper alone.

The amount of phenolic resin in sheet 10 after the scraping process should be maintained within the limits of the ratio of 1.5 to 1.7, i. e. a resin content of 50% to 70% of the weight of the dry paper. If less than a 1.5 resin ratio is present, the surface sheet may not bond satisfactorily to the base portion. If more than a 1.7 resin ratio is in the surface sheet, the resin may exude to the scraped surface and strike through the subsequently applied decorative surface finish.

Figure 2:
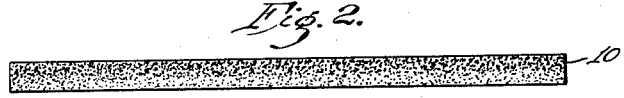
Fig. 2 is a view in side elevation and greatly exaggerated of the sheet of fibrous material after it has been subjected to the treatment as illustrated in Fig. 1.

As shown in Fig. 2 of the drawings, a sectional view of the strip will show a gradation in the amount of impregnating resin content from the one surface which is substantially free of resin to the other side of the strip.

Figure 3:
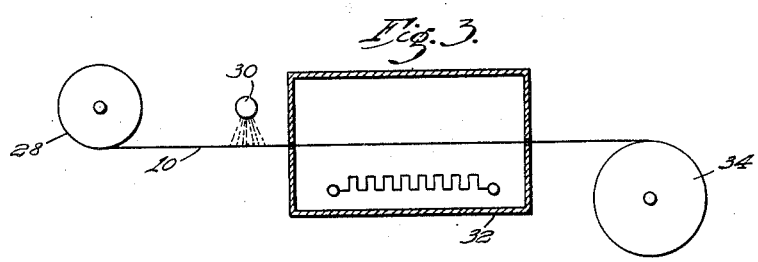
Fig. 3 is a schematic view of apparatus employed in another step of the process for producing the article of this invention.

Referring to Fig. 3 of the drawings, the roll 28 of B stage phenolic resin coated paper is passed below spraying device 30 which applies a quantity of a decorative organic finish to the phenolic-resin-free surface of strip 10. The organic resin coated strip 10 is then conveyed through a drying oven 32 to remove solvents and to set the coating upon the strip. The surface sheet is now complete and is gathered into a roll 34.

Figure 4:
Fig. 4 is a view in side elevation and greatly exaggerated of the fibrous material after it has been treated in accordance with a step of the process of Fig. 3.

The appearance of a cross section of the surface sheet 40 at this stage of the process is shown in Fig. 4. The organic finish coating 36 is present on the surface of the strip 10 which is substantially free of phenolic resin. It has been discovered that by means of this distribution of decorative surface coating and impregnating resin that not only is the adhesion of the coating 36 to the strip 10 a maximum, but there is no excess phenolic resin to strike through the organic finish.

In order to provide a durable, odor-free organic finish coating 36 on the surface sheet, it has been found that a melamine-aldehyde resin, which is substantially urea-free, produces highly successful results. Urea resins when present in coatings of the type shown at 36 evolve considerable amounts of gases and odors when subjected to conditions of humidity, and when incorporated into refrigerators, in particular, an objectionable odor level may be frequently produced. Substantially complete absence of urea resin is necessary to produce an organic finish which is of an extremely low or negligible odor level.

The urea-free melamine resin is the reaction product of melamine and an aldehyde, preferably formaldehyde. However, other aldehydes will result in resins having usefulness for substantially odor free surface finish. A satisfactory process for preparing a comminuted cellulose fiber and melamine resin mixture is to dip sheets of alpha pulp in molding type melamine aldehyde resin, dry the coated sheet below 80° C. and shred the coated sheet into a fine powder suitable for forming spraying solutions.

When formaldehyde is reacted with melamine, it has been found that two mols of formaldehyde per mol of melamine produces the lowest odor level when wet. However, a reaction product from a three to one mol ratio of formaldehyde to melamine produces a resin which is entirely acceptable for most purposes. The melamine-aldehyde resin is soluble in 50% ethyl alcohol.

Melamine resins are preferable to resins containing urea for the further reason that the melamine resins may be molded at higher temperatures—for example, 150° C.—than are the urea containing resins which mold at about 135° maximum temperature. When urea containing resins are molded above 135° C., they are liable to chemical changes which will result in ruined finished coatings.

In preparing the melamine-aldehyde resin for use upon molded articles and door panels for refrigerators, it is desirable to increase the strength of resin coatings and to impart greater resistance to checking by introducing predetermined quantities of comminuted or finely shredded cellulosic fibres. Shredded paper fibres having a size of from 0.1 mm. to 0.8 mm. in length and an average diameter of about 0.01 mm. have imparted these characteristics to the coating as well as advantageous improvements in surface gloss. A simple method of incorporating the cellulosic fibres into the resin is to mix the two while the melamine resin is in powder form.

To secure predetermined color in the surface coating, a suitable pigment is added to the mixture of paper fibre and resin either before or after a solvent has been added. Zinc sulphide, titanium oxide and other materials may be added to produce a uniform white color in the surface coating. For colored finishes, other pigments of appropriate color may be added. The characteristics of the various pigments are known to the art, and need not be further enumerated.

In producing a liquid coating composition suitable for spraying by the apparatus 30, it has been found that a solid content prepared by combining upwards of 50% up to 65% of melamine-aldehyde resin with from 10% to 30% of comminuted cellulosic fibres of the type previously specified and the balance pigment and coloring material results in satisfactory finishes. A finish composition for spraying is prepared by incorporating 50% by weight of solids to 50% by weight of 50% water-alcohol solvent. The quantity of solvent may be increased depending upon the spraying characteristics desired. Spraying has been found to be productive of an exceedingly uniform glossy coating on the surface sheet, and will generally be preferred, though brushing and other coating methods may be employed.

The sheet 40 is preferably coated with sufficient melamine resin to bring the total resin content to a ratio of 1.8 to 2.2. A surface sheet within this range of resin content may be consolidated with a base portion of straight phenolic laminate with satisfactory bond therebetween. The melamine surface finish is present in sufficient thickness to assure adequate life and resistance to scratching and other mechanical abuse.

Figure 5:
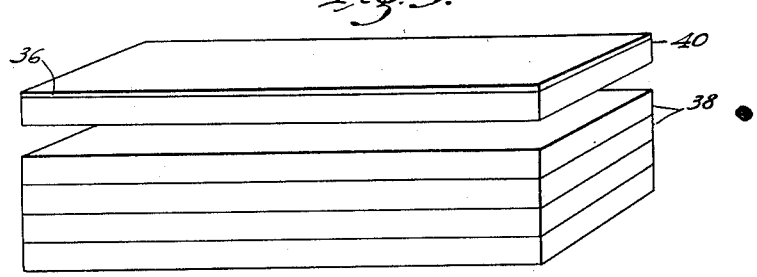
Fig. 5 is an exploded view in perspective of stacked laminated material forming the article of this invention.

Referring to Fig. 5 of the drawings, the molded article or panel is effected by combining a plurality of phenolic resin impregnated sheets 38, produced by customary methods and practices, and the surface sheet 40 carrying the coating 36 cut off from roll 34, the surface coating 36 being uppermost when the sheets are stacked. In molding presses the surface 36 of the sheet 40 is in contact with a highly polished plate which is inert to the chemicals in the sheets. Preferably a polished stainless steel separator sheet is used for the purpose. When molded at a temperature of from 135° C. to 150° C., the phenolic resins in the sheets 38 and 40 will flow and cement the stack into an integral article. The resin coating 36 will likewise penetrate to some degree into sheet 10 and become bonded to the whole. Suitable pressures for this purpose are from 1000 to 2000 pounds per square inch.

A substantially urea free melamine-aldehyde finish coating possesses highly advantageous characteristics over other organic finishes. In hardness the resin resists scratching as well as or better than ordinary window glass. When carborundum grit is rubbed under pressure over the surface, the loss of gloss is less than that of any other resin tried in molding similar panels. For example, urea resin coatings failed in this test long before melamine-aldehyde resin coatings showed signs of failure.

When exposed to high humidity or when wetted with water or even when subjected to boiling water, melamine-aldehyde coatings prevented moisture penetration to a high degree and resisted delamination after many days in boiling water.

Upon exposure to moisture, food and fruit acids, and ultra-violet light, the melamine-aldehyde coating had the least color change of many resins. Color stability is a highly important characteristic of surface coatings.

In some cases it is desirable to produce a degree of control warpage in the molded article. It has been found in refrigerator panels in particular that a curvature of the panel inward of the door gives improved insulation holding properties and other desirable features. Such a warped panel 42 is shown in Fig. 6. The process for producing such an article consists in applying a predetermined resin content to the base portion sheets 38 of kraft paper in Fig. 5 and a greater quantity of resin to the alpha pulp surface sheet 40. The base portion fibrous sheets 30 are impregnated with phenolic resins in a resin ratio of 1.4 to 1.5. Good bonding and strength are obtained when the resin content is maintained within this range. This ratio designates a quantity of resin weighing from 40% to 50% of the weight of unimpregnated fibrous base material. Warpage becomes uncontrollable and excessive when the resin content is below a 1.4 ratio.

When producing molded panels having a thickness ranging from $\frac{1}{16}$ inch to $\frac{3}{32}$ inch with a warpage suitable for refrigerator door panel purposes, the alpha pulp surface sheet 40 should have a combined phenolic and melamine aldehyde resin content ratio of from 1.8 to 2.2. When sheets 38 containing resin in the ratio of 1.4 to 1.5 are combined with sheets 40 with a resin ratio of 1.8 to 2.2 the molded article has a definite bow or warpage which is barely noticeable to the eye when installed in a refrigerator, but is of sufficient magnitude to assist in maintaining the insulation in place.

Curves 44 and 46 in Fig. 7 illustrate the warpage secured with base portion sheets 38 made of kraft paper when molded with alpha pulp surface sheets. Curve 44 is the degree of warpage with the grain of the kraft paper, that is, along the length of the sheet as laid by the paper making machine, while curve 46 is transverse to the direction of the sheet in the paper laying machine. It has been found that a definite orientation of the paper fibres occurs when the suspension of the paper fibres in liquid is poured over the paper making screens traveling at a high rate of speed. These fibres are generally oriented in the direction of travel of the screens or the length of the machine. The shrinkage characteristics of the resin impregnated paper under pressure and temperature are illustrated by the curves 44 and 46. By employing kraft paper placed in predetermined directions with respect to the length of panel 42 of Fig. 6, the warpage may be controlled both as to length and width of the panel.

Where there is no desire to produce a material having a predetermined degree of warpage, the paper of the surface sheet and of the base portion sheets may be the same material and the resin content of the base portion increased above 1.5 ratio. In this case, warpage is substantially negligible. In addition, by laying the sheets of kraft paper alternately with the grain perpendicular in adjacent sheets, the warpage may be somewhat reduced.

Although this invention has been described with reference to a particular embodiment thereof, it is not to be limited thereto except insofar as is necessitated by the scope of the appended claims.

I claim as my invention:

1. A molded article comprising, in combination, a base portion composed of laminated sheets of fibrous material impregnated with a phenolic condensate, a surface sheet of fibrous material so impregnated with phenolic condensation resin as to have one of its surfaces substantially free of the impregnating phenolic resin, the total weight of the phenolic resin and the sheet, being in a ratio of 1.5 to 1.7 to the weight of unimpregnated sheet and a coating of substantially urea-free melamine-aldehyde reaction product carried by the surface sheet upon the surface substantially free of phenolic resin, the base portion, surface sheet and melamine-aldehyde coating being consolidated under heat and pressure into an integral unit.

2. A molded article comprising a base portion composed of laminated sheets of fibrous material impregnated with a phenolic condensation resin, a surface sheet of fibrous material so impregnated with a phenolic resin as to have one of its surfaces substantially free from the impregnating resin, and a coating of substantially urea-free melamine-aldehyde resin carried by the surface sheet on the surface substantially free of the phenolic resin, the base portion, surface and coating being consolidated under heat and pressure into an integral unit, the total weight of the phenolic resin and the sheets of the base portion being in a ratio of 1.4 to 1.5 to the weight of the unimpregnated sheets and the combined melamine-aldehyde resin and phenolic resin of the surface sheet being in a higher ratio to the weight of the unimpregnated surface sheet to give the consolidated unit a predetermined warpage.

3. A molded article comprising, in combination, a base portion composed of fibrous material impregnated with a phenolic resin, the total weight of resin and fibrous material being a ratio of 1.4 to 1.5 to the weight of the unimpregnated fibrous material, a surface sheet of fibrous material so impregnated with phenolic resin as to have one surface substantially free of phenolic resin and a coating comprising more than 50% of melamine-aldehyde resin, 10% to 30% of comminuted cellulosic fibre for strengthening purposes and the balance including coloring pigment, the coating being carried by the substantially phenolic-resin-free surface of the surface sheet, the base portion, surface sheet and coating being consolidated under heat and pressure to produce an integral unit having the coating on one face, the combined weight of resin and the surface sheet being greater than a ratio of 1.5 to the unimpregnated surface sheet to provide for predetermined warpage in the molded article.

4. A refrigerator door panel having substantially odor-free characteristics, comprising a base portion of fibrous material impregnated with phenolic resin, the total weight of resin and fibrous material in a ratio of 1.4 to 1.5 to the weight of the unimpregnated fibrous material, a surface sheet of fibrous material so impregnated with phenolic resin as to have one surface substantially free of the phenolic resin, and a coating composed of more than 50% melamine-aldehyde resin which is substantially urea-free, 10% to 30% comminuted cellulosic fibres of a length of from 0.1 mm. to 0.8 mm. to provide for strengthening of the coating and the balance substantially all pigment, carried by the phenolic-free surface of the surface sheet, the base portion and surface sheet and coating being consolidated under heat and pressure into an integral panel faced with the coating, the surface sheet having a combined weight of resin and sheet of more than a ratio of 1.5 to the weight of the unimpregnated surface sheet to provide for predetermined warpage to the panel, the coating and surface sheet being resistant to delamination under refrigerator humidity and temperature conditions, and the coating being highly resistant to scratching.

HOWARD M. ELSEY.